United States Patent
Grosman et al.

(10) Patent No.: US 12,452,349 B2
(45) Date of Patent: Oct. 21, 2025

(54) GLOBAL CLOCK OVERHEAD WITH ASYMMETRIC WAITING TIME

(71) Applicant: HUAWEI TECHNOLOGIES CO., LTD., Shenzhen (CN)

(72) Inventors: Ronen Grosman, Kanata (CA); Huaxin Zhang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 18/111,145

(22) Filed: Feb. 17, 2023

(65) Prior Publication Data
US 2024/0283855 A1 Aug. 22, 2024

(51) Int. Cl.
*H04L 69/28* (2022.01)

(52) U.S. Cl.
CPC .................... *H04L 69/28* (2013.01)

(58) Field of Classification Search
CPC ...................................... H04L 69/28
See application file for complete search history.

(56) References Cited

U.S. PATENT DOCUMENTS

2024/0283855 A1* 8/2024 Grosman ................ H04L 69/28

OTHER PUBLICATIONS

Corbett et al. Spanner: Google's Globally Distributed Database. ACM Transactions on Computer Systems, vol. 31, No. 3, Article 8, Publication date: Aug. 2013. https://research.google/pubs/pub39966/.
Dragojevic et al. FaRM: Fast Remote Memory. Usenix The Advanced Computing Systems Association This paper is included in the Proceedings of the 11th USENIX Symposium on Networked Systems Design and Implementation (NSDI '14). Apr. 2-4, 2014 • Seattle, WA, USA https://www.usenix.org/conference/nsdi14/technical-sessions/dragojevi%C4%87.
Kimball, Spencer and Sharif, Irfan Jan. 27, 2022. Living without atomic clocks: Where CockroachDB and Spanner Diverge. Cockroach Labs. https://www.cockroachlabs.com/blog/living-without-atomic-clocks/.
Ranganathan 2021. Distributed Transactions without Atomic Clocks. YugabyteDB, pp. 1-61 https://www.yugabyte.com/wp-content/uploads/2021/05/Distributed-Transactions-Without-Atomic-Clocks.pdf.

* cited by examiner

*Primary Examiner* — Christopher B Robinson
*Assistant Examiner* — Tania M Pena-Santana

(57) ABSTRACT

Method, apparatus and system for assigning a commit sequence number (CSN) to a WRITE transaction in a network having nodes and a global time server. The CSN is defined by a timestamp of the WRITE transaction and an error bound of the timestamp. The WRITE transaction is committed after the timestamp is issued and an amount of time equal to the error bound plus a time adjust value has passed. The time adjust value is based on round-trip times between the plurality of nodes and the global time server. The time adjust value may be the longest expected round-trip time. By waiting for an amount of time equal to the error bound plus the time adjust value, any READ transaction occurring after the WRITE transaction may receive a READ timestamp without any delay, provided the READ timestamp error bound is less than or equal to the time adjust value.

17 Claims, 4 Drawing Sheets

GLOBAL CLOCK OVERHEAD WITH ASYMMETRIC WAITING TIME

CROSS-REFERENCE TO RELATED APPLICATIONS

This is the first application filed for the present invention.

FIELD OF THE INVENTION

The present invention pertains to synchronization of clocks between network nodes, in particular in relation to online transaction processing.

BACKGROUND

Online transaction processing (OLTP) database systems may provide snapshot timestamps and commit sequence numbers (CSN) to transactions. A timestamp or a CSN may be defined as a number assigned to an initiated transaction. The snapshot timestamp number, assigned to a READ transaction, defines when data read from a memory becomes available to the READ transaction. During its lifespan, an initiated transaction may get assigned a CSN number when the initiated transaction is a WRITE transaction, after the WRITE transaction is finalized and all its modifications were successfully recorded to storage. A numerical ordering of the snapshot timestamps and of the CSNs defines which transactions are visible to other transactions. For example, if transaction A (which is a WRITE transaction) is assigned CSN number 10 upon completion, and a subsequent transaction B is issued snapshot number is 11, then because the snapshot number 11 is later than the CSN 10, transaction B will see all modifications made by transaction A. A transaction with snapshot number 9 initiated before completion of transaction A will not be able to see transaction A.

In a clustered or cloud-based multi-node database environment one may define at least two methods for snapshot timestamp and CSN number assignment. One method for transaction number assignment is a centralized method, where a dedicated node assigns numbers to each transaction across the multi-node database as either a snapshot timestamp number or CSN. The numbers keep incrementing for each assignment. As the number of nodes in a cloud-based multi-node database increases, centralized snapshot timestamp and CSN number assignment method may have scalability limitations. Another method for transaction number assignment is distributed and decentralized and each node may assign snapshot timestamps or CSNs to transactions. The distributed (decentralized) method is scalable, and, consequently, is appealing to modern large database system.

FIG. 1 shows a prior art system topology with two network nodes 101 and 102 synchronized with a global time server 100 that serves as a reference time source. Other nodes (not shown) in the same system periodically request and receive current time updates from the global time server 100. The received current time updates are used to synchronize a local clock at a particular node to the global time server. However, the synchronization of a network node with the global time server takes time (round-trip time) to complete. The round-trip time, which is the time lapsed from the moment the network node (e.g., network node 101) sends a time request to the global time server 100 to the moment it receives a response from global time server 100 constitutes the largest deviation from the time value received at the network node 101. This is the "time uncertainty" at a moment the network node 101 receives the time value from the global time server 100. As time goes on, the local clock at network node 101 could further deviate from the global time server due to the clock drift rate. CPU vendors typically guarantee that such clock drift rate is bounded by an upper bound, e.g., 200 microseconds per second.

The maximum local clock deviation at a network node (101 or 102) may be calculated by adding the time uncertainty after a last sync up with the global time server, and the accumulated clock drift since the last sync up, which is the round-trip time corresponding to the last sync up plus the time elapsed since the last sync up, multiplied by a clock drift rate: time uncertainty=(round trip time+clock drift since the last sync).

Therefore, at any time, the local clock reading at a network node (101 or 102) is bounded by the time uncertainty (an error bound). A transaction at a network node (101 or 102) may be assigned a timestamp based on the network node 101 clock reading and the related error bound. The error bound presents the uncertainty of the timestamp at the network node, and it must be waited out in order to ensure that subsequent transactions receive timestamps consistent with (greater than) the timestamps of previous transactions. After waiting out the time uncertainty, the network node may assign a CSN number or a snapshot timestamp to the transaction according to time the transaction was initiated at and also in accordance with the error bound. FIG. 2 shows a prior art timestamp assignment process at a network node. After the network node receives, at time T1, a request for a WRITE transaction A (TrxA), a timestamp TS1 is obtained and an error bound TS1_EB of the timestamp is also obtained. A WRITE transaction timestamp equal to TS1+TS1_EB is assigned to TrxA. Subsequently, a WRITE transaction CSN for TrxA is obtained by converting the WRITE transaction timestamp to an integer value according to any suitable conversion algorithm, as described elsewhere in the present disclosure. That is, a CSN is assigned to TrxA after a waiting period of TS1_EB, where TS1_EB is the value of the error bound associated with the timestamp TS1. From the moment T1a=TS1+TS1_EB, any transaction with a snapshot timestamp with a value larger than T1a will be able to see TrxA's modifications. T1b shows when the completion of TrxA becomes visible to the client. Subsequently, after receiving a request for a READ transaction B (TrxB), at time T2, TrxB gets a timestamp snapshot TS2 and an error bound TS2_EB, which both define the value of the READ timestamp (or snapshot timestamp) of transaction TrxB: READ timestamp=TS2+TS2_EB. A READ CSN may then be obtained by converting the READ timestamp to an integer value using the selected algorithm. Any transaction with a timestamp greater than TS2+TS2_EB can see both TrxA and TrxB.

Some distributed database systems may have a centralized clock node assigning CSNs in a monotonic increasing order. The increasing order may be monotonic in the sense that in some embodiments, different system nodes may issue the same CSN. Each transaction upon completion is assigned a CSN from the centralized clock node. A transaction with an assigned CSN broadcasts its CSN to every node in the system. When a new READ transaction is initiated at a particular node, the system may simply assign the largest CSN value+1 as a snapshot timestamp to the new transaction, ensuring that the new transaction can see all completed transactions.

Timestamps assigned by a local clock require some wait time (waiting out the time uncertainty) to ensure that clock skew between network nodes does not corrupt the global order of timestamps/CSNs assigned at different nodes. However, such wait time may hinder the system performance.

High-precision local clocks may be used to mitigate the wait time overhead for locally assigned timestamps. The wait time overhead reduction may be achieved by remote direct memory access (RDMA), e.g., by using fast remote memory (FaRM) and repeatedly synchronizing the clocks of the network nodes. Other approaches may specify a maximum time uncertainty, when transactions are simply aborted if their time uncertainty exceeds the allowed maximum.

Database systems with a share-nothing architecture may be defined as systems where each node possesses its own data. Consequently, snapshot timestamps for local transactions may have no overhead (time uncertainty) associated thereto. For a new local transaction, a snapshot timestamp may involve only a trivial assignment of the last assigned CSN+1 from this node. Such trivial assignment of the current (the last assigned) CSN+1 ensures that the new local transaction may see and use all the previous transactions. Only new non-local transactions will require a timestamp with time uncertainty assigned, and, consequently, such new non-local transactions will pay the cost of waiting.

In database systems with a share-everything architecture, every transaction is a non-local transaction, as cloud-native database nodes may own a copy of data originally located at another node. Therefore, every CSN and snapshot timestamp have associated thereto a respective time uncertainty (waiting overhead). This may cause about 30% performance degradation compared to systems with a share-nothing architecture.

In cloud-native database systems, the bulk of customer workload is READ-heavy rather than WRITE-heavy. Consequently, in distributed database systems a timestamp assignment to a READ transaction (or to other non-WRITE transactions) is much more frequent than a timestamp assignment to a WRITE transaction.

Therefore, improvements in network node clock synchronization are desirable.

This background information is provided to reveal information believed by the applicants to be of possible relevance to the present invention. No admission is necessarily intended, nor should be construed, that any of the preceding information constitutes prior art against the present invention.

SUMMARY

Embodiments of the present invention provide methods, apparatuses and systems for timestamp-based global clock solutions. Such methods, apparatuses, and systems account for waiting time associated with an expected snapshot timestamp assignment of a READ transaction by including an additional wait time to the WRITE transactions. This allows READ transactions that have a timestamp error bound less than or equal to the additional wait time to receive their respective snapshot timestamp without waiting. The methods, apparatuses, and systems may further overlap waiting time at transaction completion with other processing steps making the waiting time transparent to the end user. Consequently, embodiments of the present disclosure may provide global clock solutions which most of the time incur zero overhead for snapshot timestamps and CSN number assignment.

In a first aspect of the present disclosure, there is provided a method for assigning a commit sequence number (CSN) to a WRITE transaction in a network having a plurality of network nodes and a global time server. The method comprises, by a network node of the plurality of network nodes: synchronizing a clock at the network node of the plurality of network nodes with the global time server, to obtain a synchronized clock having an error bound associated thereto. The method further comprises receiving a request for the WRITE transaction and, in response to the request and in accordance with the synchronized clock, generating a timestamp. The method includes defining a delay time value (DTV) as being equal to at least the error bound plus a time adjust value. The time adjust value is indicative of a round-trip duration from any network node of the plurality of network nodes to the global time server. The method additionally includes defining the CSN as being equal to the timestamp plus the error bound; and committing the WRITE transaction when the time of the clock is equal or greater than the timestamp plus the DTV.

The DTV may be equal to the error bound plus the time adjust value plus a clock drift component indicative of an amount of drift in the clock of the network accumulated since a preceding synchronization of the clock with the global time server.

The error bound may be equal to an amount of time lapsed from when the network node sends a time request to the global time server to when the network node receive a response to the time request.

The timestamp may be equal to a time at which the clock receives the request for the WRITE transaction.

The time adjust value may be based on historical round-trip times between the plurality of network nodes and the global time server. The time adjust value may be equal to a largest round-trip time from any of the plurality of network nodes and the global time server.

In another aspect of the present disclosure, there is provided a method for assigning a snapshot timestamp to a READ transaction. The method comprises, in a network having a plurality of network nodes and a global time server, by a network node of the plurality of network nodes: synchronizing a clock at the network node of the plurality of network nodes with the global time server and receiving a request for the READ transaction. The method further comprises, in response to the request, generating a READ timestamp and an error bound, and comparing the error bound to a pre-determined time adjust value indicative of a round-trip duration from any network node of the plurality of network nodes to the global time server and a clock drift rate. When the error bound is larger than the time adjust value, the method includes defining the snapshot timestamp as being equal to the READ timestamp minus the time adjust value and the method further includes issuing the snapshot timestamp to the READ transaction when the clock indicates a time equal to the snapshot timestamp plus a difference between the error bound and the time adjust value. When the error bound is equal or less than the pre-determined time adjust value, the method includes defining the snapshot timestamp as being equal to the READ timestamp minus the error bound; and issuing the snapshot timestamp to the READ transaction.

The error bound may be equal to an amount of time lapsed from when the network node sends a time request to the global time server to when the network node receive a response to the time request.

The READ timestamp may equal to a time at which the clock receives the request for the READ transaction.

In another aspect of the present disclosure, there is provided a method for assigning a commit sequence number (CSN) to a WRITE transaction in a network having a plurality of network nodes and a global time server. The method comprises, by a network node of the plurality of network nodes: synchronizing a clock at the network node of the plurality of network nodes with the global time server, to obtain a synchronized clock having an error bound associated thereto; and receiving a request for the WRITE transaction. The method further comprises, in response to the request and in accordance with the synchronized clock, generating a timestamp. The method also includes simultaneously: defining the CSN as being equal to the timestamp plus the error bound; and begin processing data associated to the WRITE transaction, processing the data associated to the WRITE transaction comprising modifying the data to obtain modified data and subsequently flushing the modified data to a memory. The method additionally includes defining a delay time value (DTV) as being equal to at least the error bound plus a time adjust value, the time adjust value being a value indicative of a round-trip duration from any network node of the plurality of network nodes to the global time server. The method also includes determining a process and flush to disk (PFD) time, the PFD time being when the processing of the data associated to the WRITE transaction is finished. When the PFD time is greater than the timestamp plus the DTV, the method commits the WRITE transaction at or after the PFD time. When the PFD time is less than or equal to the timestamp plus the DTV, the method commits the WRITE transaction at or after the timestamp plus DTV.

The timestamp may be a WRITE timestamp and the error bound a WRITE error bound. The method may further comprise receiving a request for a READ transaction and, in response to the request, generating a READ timestamp and a READ error bound. The method may further comprise comparing the READ error bound to the time adjust value. When the READ error bound is equal to or less than the time adjust value, the method may comprise defining the snapshot timestamp as being equal to the READ timestamp minus the READ error bound; and committing the READ transaction after the WRITE transaction has been committed. When the READ error bound is larger than the time adjust value, the method may comprise defining the snapshot timestamp as being equal to the READ timestamp minus the time adjust value; and committing the READ transaction when both condition A and condition B are satisfied, condition A specifying that the WRITE transaction has been committed; and condition B specifying that the snapshot timestamp is later than when the WRITE was committed. The method may further comprise converting the snapshot timestamp to a READ transaction commit sequence number (CSN), and assigning the READ transaction CSN to the READ transaction.

The DTV may be equal to the error bound plus the time adjust value plus a clock drift component indicative of an amount of drift in the clock of the network accumulated since a preceding synchronization of the clock with the global time server.

The error bound may be equal to an amount of time lapsed from when the network node sends a time request to the global time server to when the network node receive a response to the time request.

The timestamp may be equal to a time at which the clock receives the request for the WRITE transaction.

The time adjust value may be based on historical round-trip times between the plurality of network nodes and the global time server.

The time adjust value may be equal to a largest round-trip time from any of the plurality of network nodes and the global time server.

Synchronizing the clock may comprise repeatedly performing operations of: sending a global time request to the global time server; receiving a response to the global time request, the response being indicative of a global time and a duration of a round-trip from the network node of the plurality of network nodes to the global time server; and updating the time of the clock in accordance with the response.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
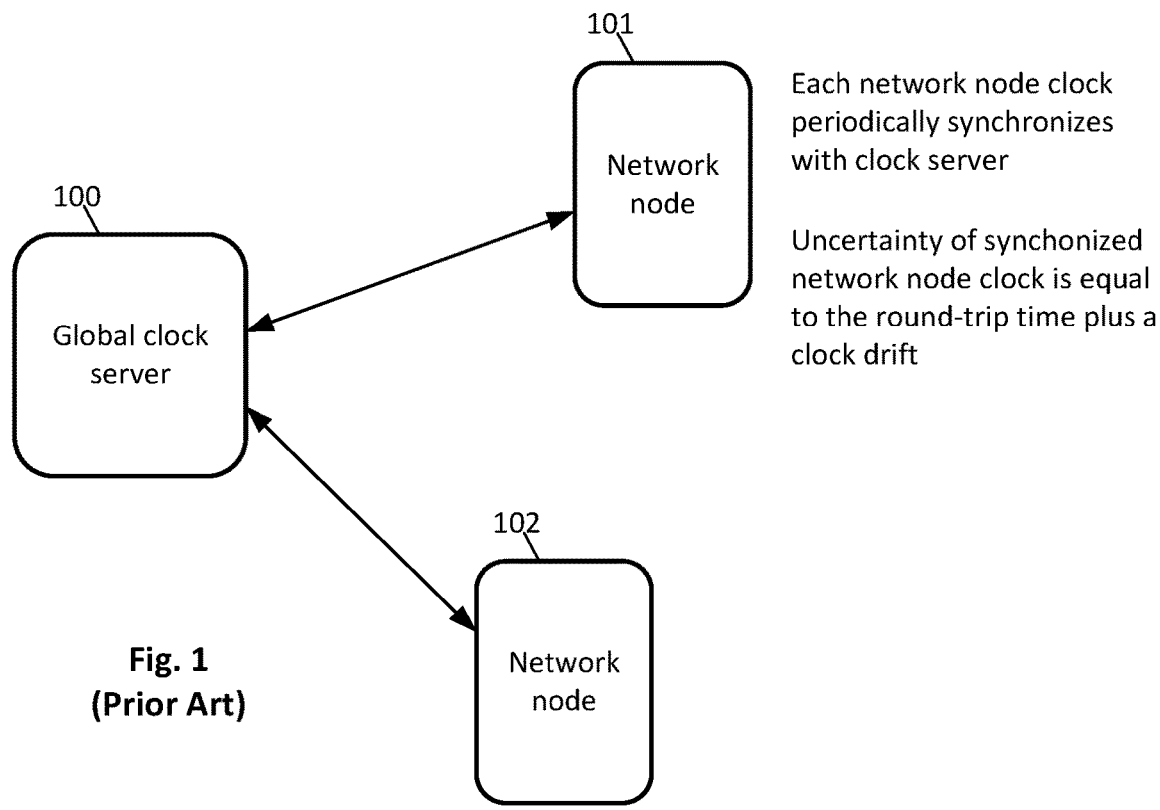
FIG. 1 shows a prior art system topology with two network nodes and a global time server.
Figure 2:
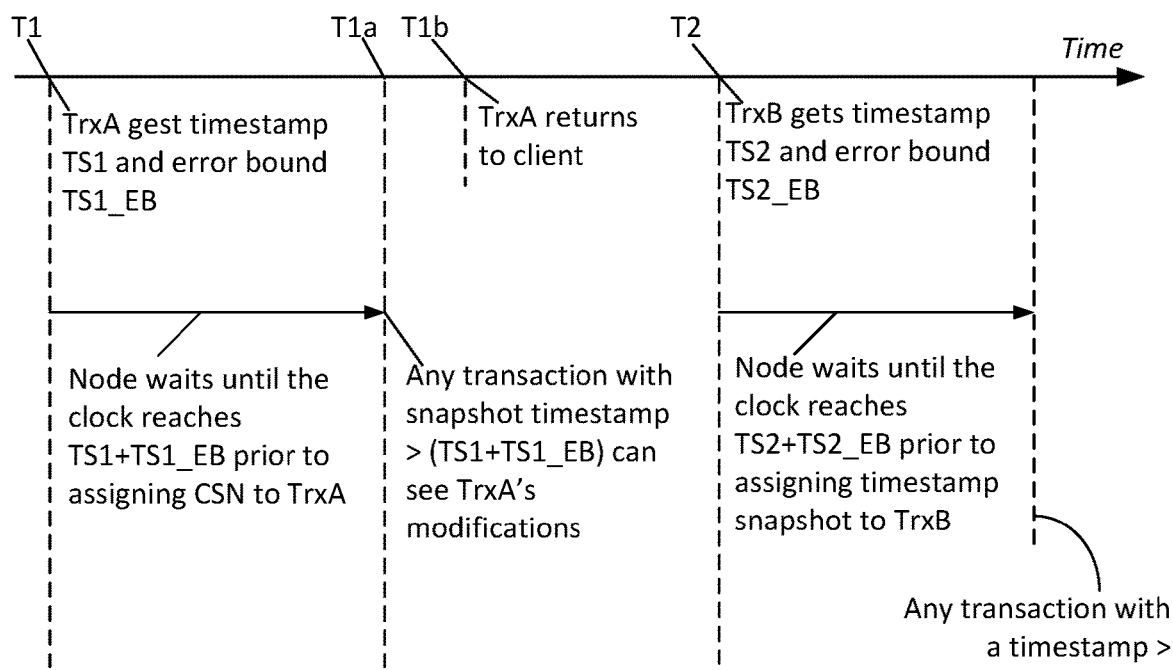
FIG. 2 shows a prior art timestamp assignment process at a network node.

Unless defined otherwise, all technical and scientific terms used herein have the same meaning as commonly understood by one of ordinary skill in the art to which this invention belongs.

In the context of the present disclosure, the largest value (maximum value) between numbers A and B is equal to A when A is larger than B and, when B is larger than A, the largest value (maximum value) is equal to B. When A and B have the same value, then A or B may be regarded as being the largest value (maximum value).

Embodiments of the present invention relate to online transaction processing (OLTP) systems that have a share-everything architecture that scales to many nodes.

As will be understood by the skilled worker, timestamps in, e.g., OLTP systems, may be provided in any suitable format such as a year, day, month, hour, minute and second format. For example, the format: MM/dd/yyyy HH:mm:ss.SSSS. As will be further understood by the skilled worker, commit sequence numbers (CSNs) may be based on any suitable conversion of the timestamp into an integer number. An example of such a conversion algorithm is the Unix epoch conversion algorithm.

In the context of the present disclosure, any WRITE transaction may have a WRITE transaction timestamp and a corresponding WRITE transaction CSN. Also, in the context of the present disclosure, any READ transaction may have a READ transaction snapshot timestamp and a corresponding READ transaction CSN.

For a WRITE transaction having associated thereto a timestamp and an error bound and occurring at a network node of a system, some embodiments disclosed herein may wait for an amount of time equal to at least the error bound of the timestamp before assigning a CSN (CSN=timestamp+error bound) to the WRITE transaction. In some embodiments, systems may wait for an amount of time (delay time value (DTV)) that includes the error bound value of the timestamp plus a system-wide waiting period (T_adjust_value) before releasing the WRITE transaction (WRITE transaction CSN). The system-wide waiting period may also be referred to as a network-wide time adjust value.

The system-wide waiting period, (T_adjust_value) may be based on historical round-trip times between the nodes of the network and a time server of the network. As an example, in some embodiments, T_adjust_value may be set to a value equal to the longest round-trip time of previous round-trip times between the nodes of the network and the time server. In some embodiments, T_adjust_value may be based on a statistical parameter of a distribution of round-trip times between the nodes of the network and the time server. In some embodiments, the statistical parameter may be an average round-trip time of the distribution of round-trip times. In some embodiments, the T_adjust_value may be based on modeled round-trip times for the network in question. In some embodiments, T_adjust_value, which is system dependent, may be set by a rule of thumb which says that T_adjust_value must be larger than most round-trip times to the global time server. Further, the T_adjust_value may include a clock drift component which is the time drift incurred at the node since the last time synchronization of the clock at the node with the time server.

In the scenario where a WRITE transaction waits for the aforementioned DTV before releasing (committing) the WRITE transaction and the CSN associated thereto, when a later timestamp of a READ transaction has an associated error bound that is less than T_adjust_value, then the snapshot timestamp of the READ transaction may be released immediately, without any waiting. Effectively, the wait time overhead for snapshot timestamps is moved to the WRITE transaction wait time.

Figure 3:
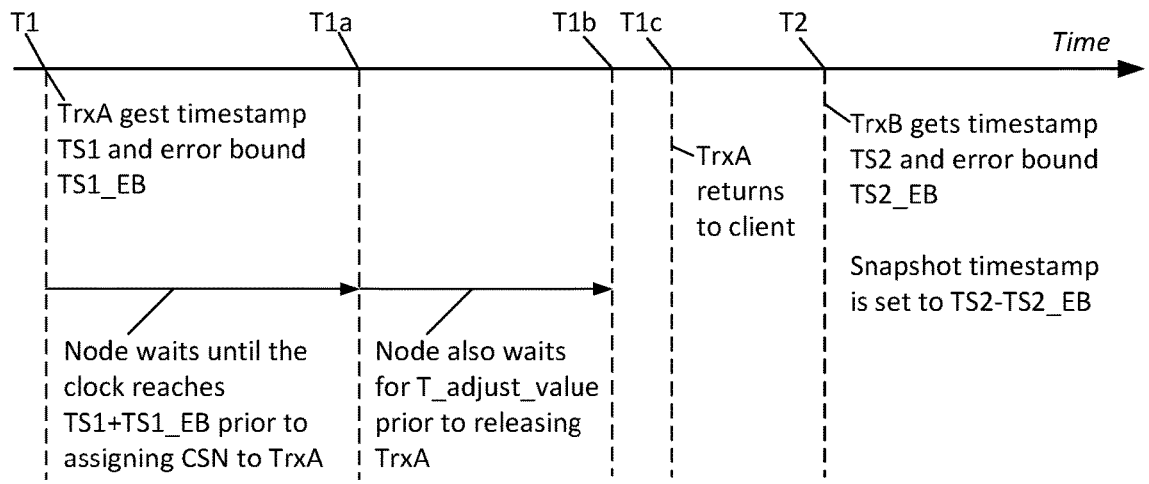
FIG. 3 shows an embodiment of a timestamp assignment process flow in accordance with the present disclosure.

FIG. 3 shows a diagram of an embodiment of a process flow in accordance with the present disclosure. In the embodiment of FIG. 3, a node issuing a timestamp TS1 (which has an error bound TS1_EB) and a CSN for a WRITE transaction (TrxA), waits not only for the clock at the node to pass the timestamp TS1 plus the error bound of TS1, but also waits for the T_adjust_value described above and associated to READ transactions. The WRITE transaction timestamp (commit timestamp) of TrxA may be set to:

$$\text{WRITE transaction timestamp} = TS1 + TS1\_EB$$

and TrxA may be committed, i.e., made available (visible) to other transactions at:

$$T1b = TS1 + TS1\_EB + T\_adjust\_value.$$

The WRITE transaction timestamp (commit timestamp) may be converted to a CSN using any suitable timestamp conversion algorithm. At time T1c, the client receives from the node associated with TrxA, confirmation that TrxA has completed.

Referring again to FIG. 3, when a READ transaction TrxB occurs at time T2, TrxB receives a timestamp TS2 to which is associated an error bound TS2_EB. When TS2_EB is less than or equal to T_adjust_value, a snapshot timestamp of TrxB may be set to the lower bound (TS2_L) of the timestamp which is equal to:

$$\text{snapshot timestamp} = TS2\_L = TS2 - TS2\_EB,$$

which is larger than the WRITE transaction timestamp (WRITE transaction timestamp=T1S+T1S_EB). At this point, TrxB may proceed, i.e., the snapshot timestamp of TrxB may be issued, and converted into a READ CSN without waiting. That is, because TS2_EB is less than or equal to T_adjust_value, the snapshot timestamp of the READ transaction may be issued without delay and without the risk of being before the WRITE transaction timestamp (commit timestamp) of TrxA.

Because OLTP workloads include mostly READ transactions rather than WRITE transactions, shifting the overhead from READ transactions to WRITE transactions benefits the overall performance of the system. Every WRITE transaction in these embodiments must wait an extra T_adjust_value during completion time before the WRITE transaction is made visible (available) to the system. As it was noted previously, transactions can see the modifications made by a particular transaction only after a CSN is successfully assigned to this particular transaction and the transaction becomes visible (is committed).

Embodiments of the present disclosure are directed to a method, an apparatus, and a system for assigning a timestamp to a WRITE transaction in a communication network. The network has a plurality of network nodes and a global time server. The method may comprise synchronization of a clock at a network node of the plurality of network nodes with the global time server. The clock is synchronized with the global time server to obtain a synchronized clock having an error bound associated thereto. The clock may be synchronized periodically. Synchronization of the clock at the network node may include sending a request for time to the global time server at a time $T_{send}$ and receiving a reply at a time $T_{rec}$. The reply comprises a synchronized time value $T_{sync}$. The time at the clock may be set to $T_{sync}$. The error bound of the synchronized clock may be a function of at least a difference between $T_{rec}$ and $T_{send}$. For example, the error bound (EB) may be equal to $T_{rec}-T_{send}$ (EB=$T_{rec}-T_{send}$). The error bound may also be a function of a drift rate (DR) of the clock at the network node (EB=$T_{rec}-T_{send}$+DR* [time since last synchronization]). The disclosed method may further include receiving a request for the WRITE transaction and, in response to the request and in accordance with the synchronized clock, obtaining a timestamp and an error bound of the timestamp.

The timestamp is the instant time of the network node clock corresponding to the moment of the reception of the request for the WRITE transaction. The WRITE transaction timestamp (commit timestamp) of a WRITE transaction may be set to a value equal to the timestamp plus the error bound of the timestamp. The release (commit) of the WRITE transaction may occur after a period of time equal to the error bound of the timestamp plus a system-wide waiting period (T_adjust_value) has passed from the moment the timestamp is obtained. As disclosed elsewhere in the present disclosure, in some embodiments, the time adjust value may be indicative of a maximum round-trip duration from any network node of the plurality of network nodes to the global time server.

If a system becomes unstable (e.g., due to network jitter), some very long sync-up time may occur and cause large error bound values. If a READ transaction timestamp TS has an associated error bound TS_EB that is larger than T_adjust_value, the READ transaction may be required to wait for a time equal to TS_EB−T_adjust_value before the snapshot timestamp is assigned to the READ transaction and the READ transaction is committed. In this scenario, the snapshot timestamp may be set to:

$$\text{snapshot timestamp} = TS\_L + TS\_EB - T\_adjust\_value$$

$$\text{snapshot timestamp} = TS - TS\_EB + TS\_EB - T\_adjust\_value$$

$$\text{snapshot timestamp} =$$

$$TS - T\_adjust\_value \, (\text{when } TS\_EB > T\_adjust\_value).$$

And the node waits until the clock at the node is as TS+TS_EB-T_adjust_value before committing the READ transaction.

Generally, a WRITE transaction comprises modifying data records stored in a database, obtaining a timestamp for the WRITE transaction (obtaining a commit timestamp) and committing the WRITE transaction. Modifying data in the data records of the database may include, for example, adding data (e.g., data such as the WRITE transaction timestamp) into a record to be flushed to disk, releasing memory, locks, and resources used by the transaction, buffering data modifying the data to obtain modified data and subsequently flushing to disk (to memory of the database) the modified data.

Figure 4:
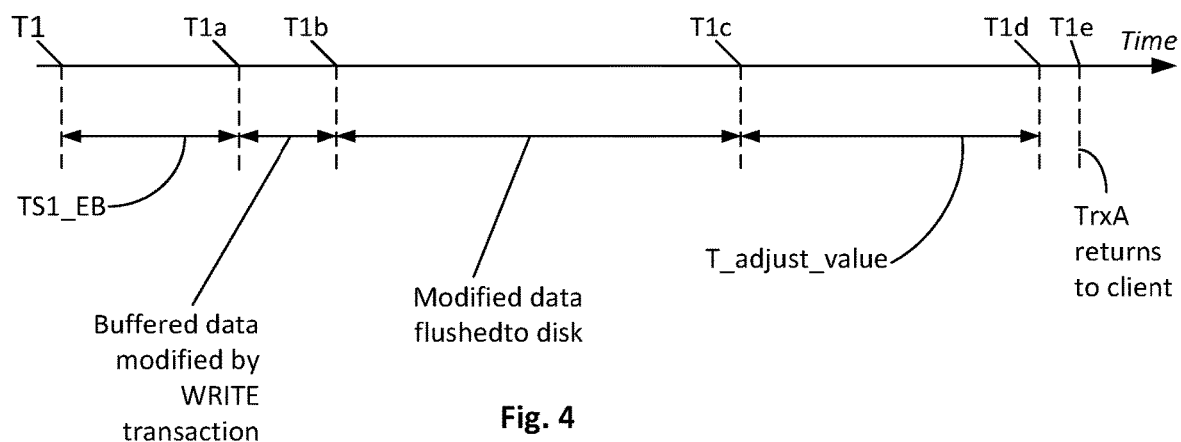
FIG. 4 shows another embodiment of a timestamp assignment process flow in accordance with the present disclosure.

The action required to modify data record take time. FIG. 4 shows an example of the present disclosure where a node receives a WRITE transaction TrxA at time T1, obtains a timestamp TS1 for the transaction as well as an error bound TS1_EB for the timestamp. At time T1a, the WRITE transaction timestamp (commit timestamp) of TrxA may be set to TS1+TS1_EB. Between T1a and T1b, the data to be modified by TrxA is buffered and modified. Between T1b and T1c, the modified data is flushed to disk (memory). Subsequently, the node waits out T_adjust_value and commits the transaction at T1d. TrxA is returned to the client at T1e.

According to some embodiments of the present disclosure, the delay time value (DTV=TS1_EB+T_adjust_value) may begin at the same time as the WRITE transaction steps of buffering and modifying data and subsequently flushing the modified data to disk. However, the WRITE transaction may only be committed when both: a) the DTV value has passed and b) after the WRITE transaction steps are completed. That is, the WRITE transaction may be committed after the largest time period between the DTV and the time required for the WRITE transaction steps has passed.

Figure 5:
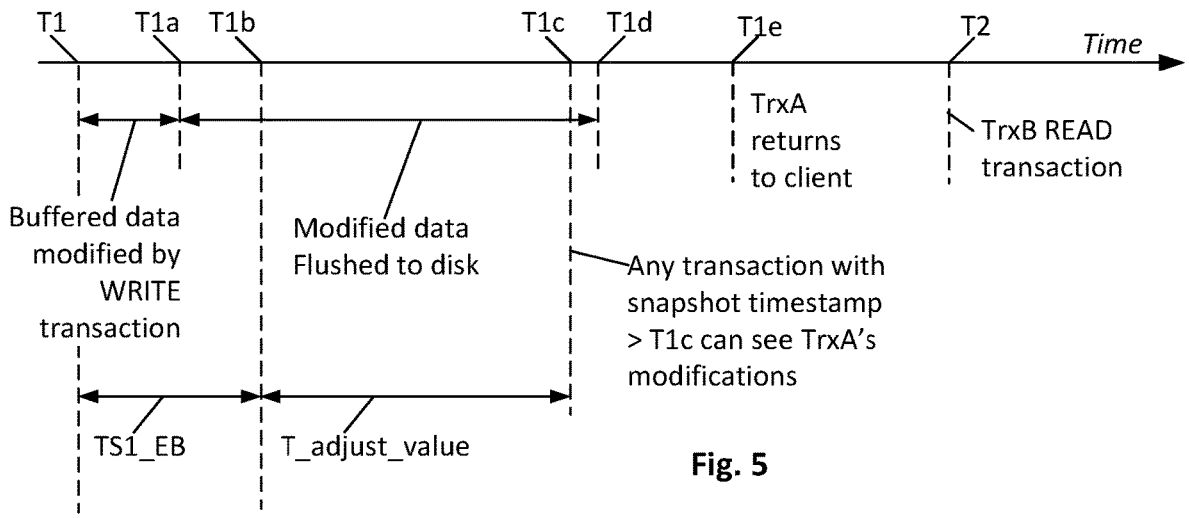
FIG. 5 shows a further embodiment of a timestamp assignment process flow in accordance with the present disclosure.

FIG. 5 shows an embodiment of a process flow in accordance with the present disclosure. In FIG. 5, a node receives a WRITE transaction TrxA at time T1 and obtains a timestamp TS1 for the transaction as well as an error bound TS1_EB for the timestamp. Subsequently, at T1b, the WRITE timestamp is issued (WRITE timestamp=TS1+TS1_EB). Also at T1, the data modifications underlying the WRITE transaction begin. That is, at T1, the actions of buffering the data to be modified and modifying that data according to the WRITE transaction begin and then end a T1a. At T1a, the actions required to flush to disk the modified data begin and then end at T1d. A T1b, when the commit timestamp is issued, the node waits for a period equal to T_adjust_value, i.e., until T1c to determine if TrxA is ready to be committed. If TrxA is not ready for being committed because the modified data of TrxA is still being flushed to disk, then the node must wait until at least T1d before committing TrxA. Similarly, the node may be configured to determine, at T1d, if TrxA is ready to be committed. If TrxA is finished waiting for T_adjust_value, then TrxA may be committed without risking TrxA being invisible to subsequent transactions. The WRITE transaction CSN is obtained by converting the WRITE transaction timestamp to the corresponding integer, as described elsewhere in the present disclosure.

In the embodiment of FIG. 5, the WRITE transaction TrxA may not be committed until at least T1d, which is the time at which the modified WRITE transaction data is finished being flushed to disk. Otherwise, a transaction occurring before T1d would not see TrxA.

In FIG. 5, the node receives a READ transaction TrxB at time T2 and obtains a READ transaction timestamp TS2 for the READ transaction as well as an error bound TS2_EB for the timestamp. When the READ transaction TrxB occurs at T2 and T2 is after the flush-to-disk operations of the previous WRITE transaction, i.e., T2 is after T1d, then the node may provide a snapshot timestamp and a READ transaction CSN as in the previous embodiment where only the difference between the error bound of the timestamp TS2 and T_adjust_value need to be considered.

That is, when T2 is after T1d and TS2_EB<T_adjust_value, then the snapshot timestamp may be set to:

$$\text{snapshot timestamp} = TS2 - TS2\_EB$$

and the READ transaction may be committed without waiting. Further, when T2 is after T1d and TS2_EB>T_adjust_value, then the snapshot timestamp may be set to:

$$\text{snapshot timestamp} = TS2 - T\_adjust\_value$$

and the READ transaction may be committed when the clock at the node indicates at least T2+TS2_EB-T_adjust_value.

However, when a READ transaction TrxB occurs at T2 and T2 is before the end of the flush-to-disk operations of the previous WRITE transaction, i.e., T2 is before T1d, then the node must wait until the time on the clock is at least after T1d to commit the READ transaction. The snapshot timestamp is attributed as before, by taking into account the magnitude of TS2_EB relative to T_adjust value. That is, when T2 is before T1d and TS2_EB<T_adjust_value, then the snapshot timestamp may be set to:

$$\text{snapshot timestamp} = TS2 - TS2\_EB$$

but the READ transaction may only be committed after T1d. And when T2 is before T1d and TS2_EB>T_adjust_value, then the snapshot timestamp may be set to:

$$\text{snapshot timestamp} = TS2 - T\_adjust\_value$$

and the READ transaction may be committed when the clock at the node indicates:

$$\text{commit time} = T2 + TS2\_EB - T\_adjust\_value$$

provided $$\text{commit time} \geq T1d.$$

Otherwise, if:

$$\text{commit time} < T1d$$

the node will wait and the READ transaction will be committed at T1d or later.

Figure 6:
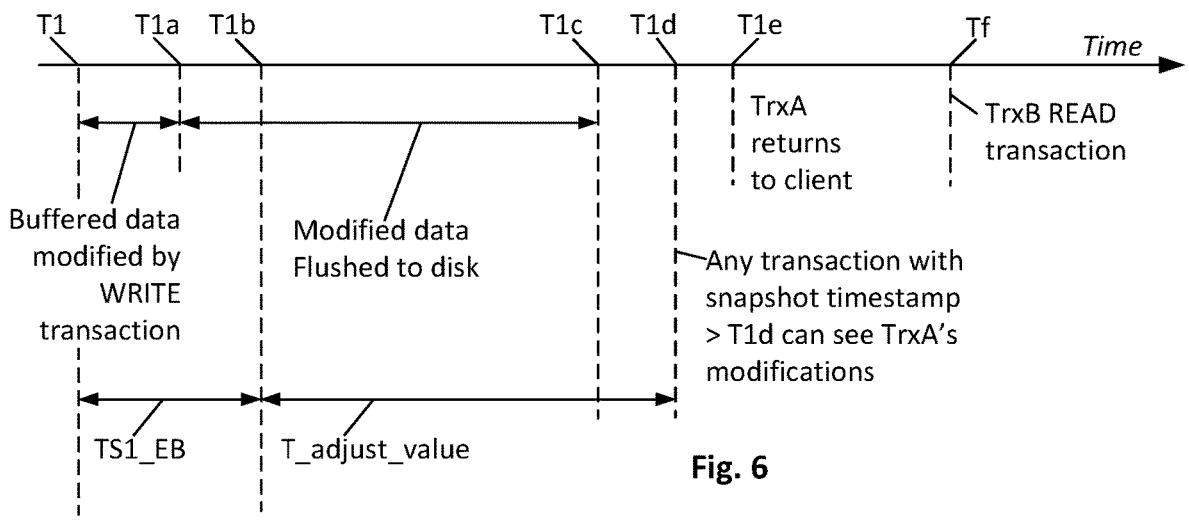
FIG. 6 shows yet another embodiment of a timestamp assignment process flow in accordance with the present disclosure.

FIG. 6 shows another embodiment of a process flow in accordance with the present disclosure. The embodiment of FIG. 6 is similar to that of FIG. 5 but in FIG. 6, the flush_to_disk operation of the WRITE transaction (TrxA) finishes before the clock reaches T1d=T1+TS1_EB+T_adjust_value. In the embodiment of FIG. 6, the WRITE transaction TrxA may not be committed until at least T1d, which is the time at which the system wide waiting period T_adjust_value expires. Otherwise, a transaction occurring before T1d may not be able to see TrxA.

In FIG. 6, the node receives a READ transaction TrxB at time T2 and obtains a READ transaction timestamp TS2 for the READ transaction as well as an error bound TS2_EB for the timestamp. When the READ transaction TrxB occurs at T2 and T2 is after the expiry of T_adjust_value of the previous WRITE transaction, i.e., T2 is after T1d, then the node may provide a snapshot timestamp and a READ transaction CSN as in the previous embodiment where only the difference between the error bound of the timestamp TS2 and T_adjust_value need to be considered.

That is, when T2 is after T1d and TS2_EB<T_adjust_value, then the snapshot timestamp may be set to:

$$\text{snapshot timestamp} = TS2 - TS2\_EB$$

and the READ transaction may be committed without waiting. Further, when T2 is after T1d and TS2_EB>T_adjust_value, then the snapshot timestamp may be set to:

$$\text{snapshot timestamp} = TS2 - T\_adjust\_value$$

and the READ transaction may be committed when the clock at the node indicates at least T2+TS2_EB-T_adjust_value.

However, when a READ transaction TrxB occurs at T2 and T2 is before the end of the T_adjust_value period of the previous WRITE transaction, i.e., T2 is before T1d, then the node must wait until the time on the clock is at least after T1d to commit the READ transaction. The snapshot timestamp is attributed as before, by taking into account the magnitude of TS2_EB relative to T_adjust value. That is, when T2 is before T1d and TS2_EB<T_adjust_value, then the snapshot timestamp may be set to:

$$\text{snapshot timestamp} = TS2 - TS2\_EB$$

but the READ transaction may only be committed after T1d. And when T2 is before T1d and TS2_EB>T_adjust_value, then the snapshot timestamp may be set to:

$$\text{snapshot timestamp} = TS2 - T\_adjust\_value$$

and the READ transaction may be committed when the clock at the node indicates:

$$\text{commit time} = T2 + TS2\_EB - T\_adjust\_value$$

provided $$\text{commit time} \geq T1d.$$

Otherwise, if:

$$\text{commit time} < T1d$$

the node will wait and the READ transaction will be committed at T1d or later.

A variable T_data_mod may be defined as the time during which the data that needs to be modified by the WRITE transaction is buffered and modified. In the embodiments of FIG. 5 and FIG. 6, T_data_mod=T1a−T1.

A variable T_Flush_Disk may be defined as the time during which the modified data is flushed to disk. In the embodiment of FIG. 5, T_Flush_disk=T1d−T1a; in the embodiment of FIG. 6, T_Flush_disk=T1c−T1a.

As will be appreciated by the skilled worker, the node at which a WRITE transaction occurs must wait until at least T1d, which is when the modified data is finished being written to disk in the embodiment of FIG. 5 or, is when T_adjust_value has expired in the embodiment of FIG. 6 before committing the WRITE transaction. Therefore, TrxA may me committed at or after T_commit, which may be defined as:

$$T\_commit = Max[(TS1 + TS1\_EB + T\_adjust\_value),$$
$$(TS1 + T\_data\_mod + T\_Flush\_disk)].$$

Figure 7:
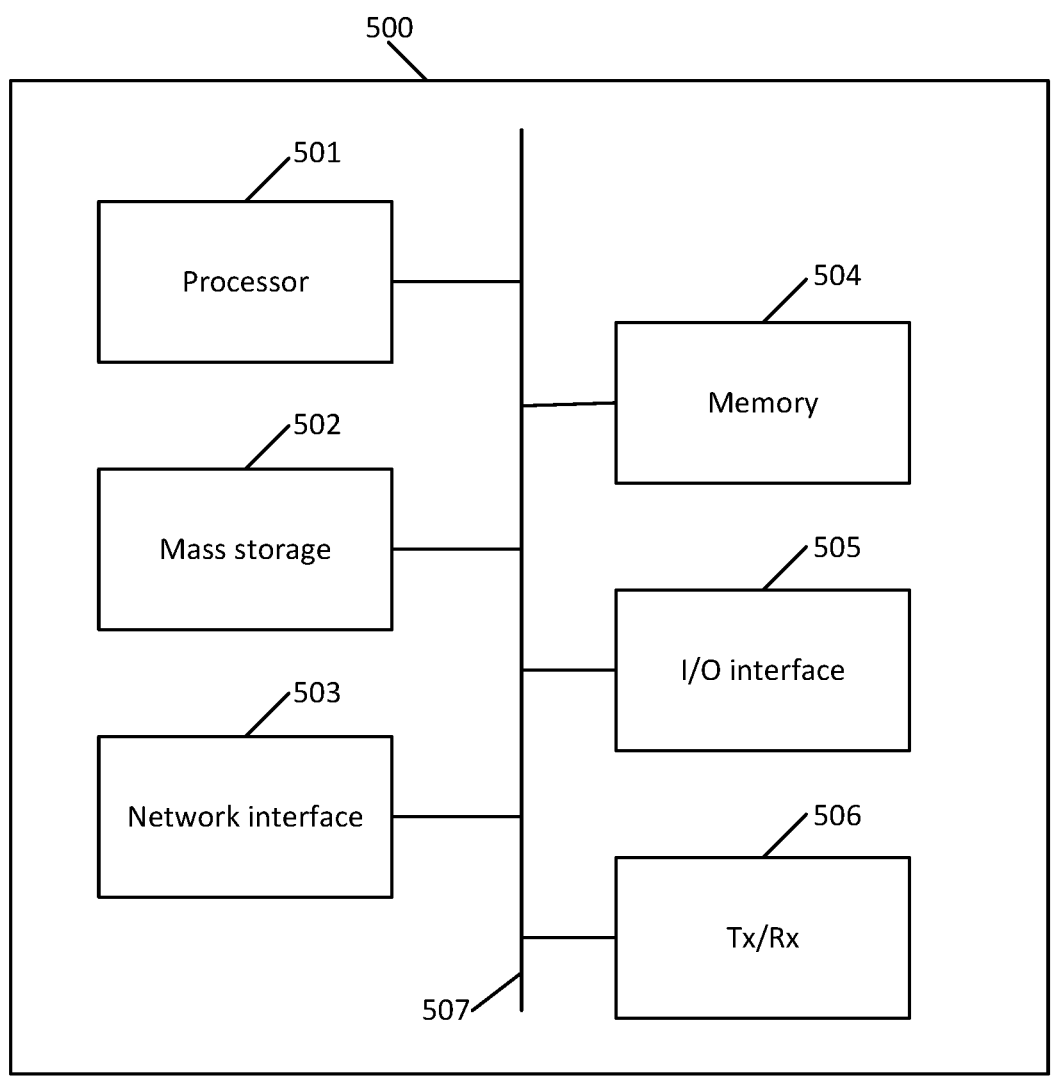
FIG. 7 shows a block diagram of an embodiment of an electronic device 500 in accordance with the present disclosure.

FIG. 7 shows a block diagram of an embodiment of an electronic device 500 in accordance with the present disclosure. The electronic device may represent a network node or a global time server. For example, a computer equipped with network function may be configured as the electronic device 500. The electronic device 500 may correspond to parts of a user equipment (UE), a network node providing network access (e.g., a gNB).

The electronic device 500 includes a processor 501, such as a Central Processing Unit (CPU) or specialized processors such as a Graphics Processing Unit (GPU) or other such processor unit, a memory 504, a non-transitory mass storage 502, an I/O interface 505, a network interface 505, and a transceiver 506, all of which are communicatively coupled via a bi-directional bus 507. According to certain embodiments, any or all of the depicted elements may be utilized, or only a subset of the elements may be utilized. Further, the device 500 may contain multiple instances of certain elements, such as multiple processors, memories, or transceivers. Also, elements of the electronic device may be directly coupled to other elements without the bi-directional bus. Additionally, or alternatively to a processor and memory, other electronics, such as integrated circuits, may be employed for performing the required logical operations.

The memory 504 may include any type of non-transitory memory such as static random access memory (SRAM), dynamic random access memory (DRAM), synchronous DRAM (SDRAM), read-only memory (ROM), or any combination of such, or the like. The mass storage element 502 may include any type of non-transitory storage device, such as a solid state drive, a hard disk drive, a magnetic disk drive, an optical disk drive, a USB drive, or any computer program product configured to store data and machine executable program code. According to certain embodiments, the memory 504 or mass storage 502 may have recorded thereon statements and instructions executable by the processor 501 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for assigning a commit timestamp to a WRITE transaction in a network having a plurality of network nodes and a global time server, the method comprising, by a network node of the plurality of network nodes:
synchronizing a clock at the network node of the plurality of network nodes with the global time server, to obtain a synchronized clock having an error bound associated thereto;
receiving a request for the WRITE transaction;
in response to the request and in accordance with the synchronized clock, generating a timestamp;
defining a delay time value (DTV) as being equal to at least the error bound plus a time adjust value, the time adjust value being indicative of a round-trip duration from any network node of the plurality of network nodes to the global time server;
defining a commit timestamp as being equal to the timestamp plus the error bound; and
committing the WRITE transaction when the time of the clock is equal to or greater than the timestamp plus the DTV.

2. The method of claim 1, wherein the DTV is equal to the error bound plus the time adjust value plus a clock drift component indicative of an amount of drift in the clock of the network accumulated since a preceding synchronization of the clock with the global time server.

3. The method of claim 2, wherein the error bound is equal to an amount of time lapsed from when the network node sends a time request to the global time server to when the network node receive a response to the time request.

4. The method of claim 1, wherein the timestamp is equal to a time at which the clock receives the request for the WRITE transaction.

5. The method of claim 1, wherein the time adjust value is based on historical round-trip times between the plurality of network nodes and the global time server.

6. The method of claim 5, wherein the time adjust value is equal to a largest round-trip time from any of the plurality of network nodes and the global time server.

7. The method of claim 1, further comprising:
converting the commit timestamp into a commit sequence number (CSN); and
assigning the CSN to the WRITE transaction.

8. A method for assigning a WRITE commit timestamp to a WRITE transaction in a network having a plurality of network nodes and a global time server, the method comprising, by a network node of the plurality of network nodes:
synchronizing a clock at the network node of the plurality of network nodes with the global time server, to obtain a synchronized clock having an error bound associated thereto;
receiving a request for the WRITE transaction;
in response to the request and in accordance with the synchronized clock, generating a WRITE transaction (WT) timestamp;
simultaneously:
defining the WRITE commit timestamp as being equal to the WT timestamp plus the error bound; and
begin processing data associated with the WRITE transaction, processing the data associated with the WRITE transaction comprising modifying the data to obtain modified data and subsequently flushing the modified data to a memory;
defining a delay time value (DTV) as being equal to at least the error bound plus a time adjust value, the time adjust value being a value indicative of a round-trip duration from any network node of the plurality of network nodes to the global time server;
determining a process and flush to disk (PFD) time, the PFD time being when the processing of the data associated to the WRITE transaction is finished;
when the PFD time is greater than the WT timestamp plus the DTV, committing the WRITE transaction at or after the PFD time;
when the PFD time is less than or equal to the WT timestamp plus the DTV, committing the WRITE transaction at or after the WT timestamp plus DTV.

9. The method of claim 8, further comprising:
converting the commit timestamp into a commit sequence number (CSN); and
assigning the CSN to the WRITE transaction.

10. The method of claim 8, wherein the error bound is a WRITE error bound, the method further comprising:
receiving a request for a READ transaction;
in response to the request, generating a READ transaction (RT) timestamp and a READ error bound;
comparing the READ error bound to the time adjust value;
when the READ error bound is equal to or less than the time adjust value:
defining a snapshot timestamp as being equal to the READ timestamp minus the READ error bound; and
committing the READ transaction after the WRITE transaction has been committed;
when the READ error bound is larger than the time adjust value:
defining the snapshot timestamp as being equal to the READ timestamp minus the time adjust value; and
committing the READ transaction when both condition A and condition B are satisfied, condition A specifying that the WRITE transaction has been committed; and condition B specifying that the snapshot timestamp is later than when the WRITE was committed.

11. The method of claim 10, further comprising converting the snapshot timestamp to a READ transaction commit sequence number (CSN); and assigning the READ transaction CSN to the READ transaction.

12. The method of claim 8, wherein the DTV is equal to the error bound plus the time adjust value plus a clock drift component indicative of an amount of drift in the clock of the network accumulated since a preceding synchronization of the clock with the global time server.

13. The method of claim 12, wherein the error bound is equal to an amount of time lapsed from when the network node sends a time request to the global time server to when the network node receive a response to the time request.

14. The method of claim 8, wherein the timestamp is equal to a time at which the clock receives the request for the WRITE transaction.

15. The method of claim 8, wherein the time adjust value is based on historical round-trip times between the plurality of network nodes and the global time server.

16. The method of claim 15, wherein the time adjust value is equal to a largest round-trip time from any of the plurality of network nodes and the global time server.

17. The method of claim 8, wherein synchronizing the clock comprises repeatedly performing operations of:
sending a global time request to the global time server;
receiving a response to the global time request, the response being indicative of a global time and a duration of a round-trip from the network node of the plurality of network nodes to the global time server; and
updating the time of the clock in accordance with the response.

* * * * *